US009769473B2

(12) United States Patent
Lin et al.

(10) Patent No.: US 9,769,473 B2
(45) Date of Patent: Sep. 19, 2017

(54) PREDICTIVE VIDEO CODER WITH LOW POWER REFERENCE PICTURE TRANSFORMATION (71) Applicant: Apple Inc., Cupertino, CA (US)

(72) Inventors: Yao-Chung Lin, Mountain View, CA (US); Xiaosong Zhou, Campbell, CA (US); Hsi-Jung Wu, San Jose, CA (US); Douglas Scott Price, San Jose, CA (US); Chris Y. Chung, Sunnyvale, CA (US); Dazhong Zhang, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 722 days.

(21) Appl. No.: 13/755,928

(22) Filed: Jan. 31, 2013

(65) Prior Publication Data
US 2013/0329799 A1 Dec. 12, 2013

Related U.S. Application Data (60) Provisional application No. 61/657,621, filed on Jun. 8, 2012.

(51) Int. Cl.
H04N 19/503 (2014.01)
H04N 19/51 (2014.01)

(52) U.S. Cl.
CPC ..... H04N 19/00587 (2013.01); H04N 19/503 (2014.11)

(58) Field of Classification Search
CPC .............................................. H04N 19/00587
(Continued)

(56) References Cited

U.S. PATENT DOCUMENTS 8,170,105 B2 5/2012 Sekiguchi et al.
2003/0108107 A1* 6/2003 Kim ...................... H04N 19/00
375/242

(Continued)

FOREIGN PATENT DOCUMENTS

GB  WO 97/03517  *  1/1997  ........... H04N 5/2628

Primary Examiner — William C Vaughn, Jr.
Assistant Examiner — Jerry Jean Baptiste
(74) Attorney, Agent, or Firm — Baker Hostetler LLP; Robert L. Hails (57) ABSTRACT Video coders may perform perspective transformation of reference frames during coding in a manner that conserves processing resources. When a new input frame is available for coding, a camera position for the input frame may be estimated. A video coder may search for reference pictures having similar camera positions as the position of the input frame and, for each reference picture identified, the video coder may perform a prediction search to identify a reference picture that is the best prediction match for the input frame. Once the video coder identifies a reference picture to serve as a prediction source for the input frame, the video coder may derive a transform to match the reference frame data to the input frame data and may transform the reference picture accordingly. The video coder may code the input frame using the transformed reference picture as a prediction reference and may transmit coded frame data and the camera position of the input frame to a decoder. Thus, the video coder may perform derivation and execution of transforms on a limited basis which conserves system resources.

27 Claims, 5 Drawing Sheets

(58) Field of Classification Search
USPC .......................................................... 375/240
See application file for complete search history.

(56) References Cited

U.S. PATENT DOCUMENTS

| | | | |
|---|---|---|---|
| 2003/0174775 A1* | 9/2003 | Nagaya ................. | H04N 7/181 |
| | | | 375/240.12 |
| 2007/0014369 A1* | 1/2007 | Santhoff .............. | H04B 1/7163 |
| | | | 375/240.27 |
| 2009/0201384 A1* | 8/2009 | Kang ..................... | H04N 5/247 |
| | | | 348/222.1 |
| 2009/0279606 A1* | 11/2009 | Lee ..................... | H04N 7/26037 |
| | | | 375/240.12 |
| 2010/0002770 A1* | 1/2010 | Motta ................... | H04N 19/147 |
| | | | 375/240.16 |
| 2010/0097398 A1* | 4/2010 | Tsurumi ................ | H04N 5/144 |
| | | | 345/634 |
| 2010/0195734 A1* | 8/2010 | Huang ................... | H04N 19/57 |
| | | | 375/240.16 |
| 2011/0206124 A1* | 8/2011 | Morphet et al. ......... | 375/240.16 |
| 2011/0222597 A1* | 9/2011 | Xu ....................... | H04N 19/70 |
| | | | 375/240.01 |

* cited by examiner

FIG. 4
400

PREDICTIVE VIDEO CODER WITH LOW POWER REFERENCE PICTURE TRANSFORMATION

CROSS-REFERENCE TO RELATED APPLICATION

The present invention benefits from priority afforded by U.S. patent application Ser. No. 61/657,621, filed Jun. 8, 2012, entitled "Low Power Reference Picture Transformation," the entirety of which is incorporated herein by reference.

BACKGROUND

The present invention relates to video coding and, in particular, to video coding systems that apply perspective transforms to prediction data.

Capturing high quality video using mobile devices for storage or transmission can be difficult because captured content can change widely and rapidly. Generally, the capturing process involves video processing followed by video compression, both of which generally rely on simple motion models. While video stabilization techniques are often utilized on mobile devices, these techniques simply reduce irregularities in the camera trajectory, and they smooth, but do not eliminate distortion, due to camera translation in free space.

Figure 1:
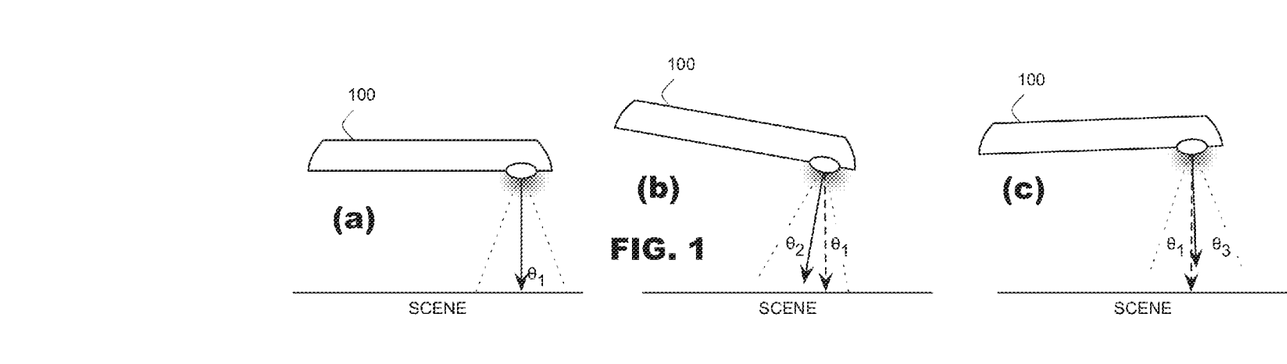
FIG. 1 schematically represents effects of camera rotation on video data.

FIG. 1 schematically represents effects of camera rotation on video data. In many use cases, camera operators attempt to hold a camera still during image capture but cannot maintain the camera perfectly still. The camera may move on a frame-to-frame basis, which changes the camera's angle of orientation with respect to the subject being imaged. In other use cases, camera operators capture image information of moving subjects, which varies the camera's orientation with respect to different objects in a field of view, not only the subject being imaged but also background elements within the field of view.

Accordingly, the inventors have identified a need in the art for video coding techniques that normalize effects of changing orientation in image data as part of prediction.

DETAILED DESCRIPTION

Embodiments of the present invention provide techniques for video coders to perform perspective transformation of reference frames during coding in a manner that conserves processing resources. When a new input frame is available for coding, a camera position for the input frame may be estimated. A video coder may search for reference pictures having similar camera positions as the position of the input frame and, for each reference picture identified, the video coder may perform a prediction search to identify a reference picture that is a best prediction match for the input frame. Once the video coder identifies a reference picture to serve as a prediction source for the input frame, the video coder may derive a transform to match the reference frame data to the input frame data and may transform the reference picture accordingly. The video coder may code the input frame using the transformed reference picture as a prediction reference and may transmit coded frame data and the camera position of the input frame to a decoder.

Figure 2:
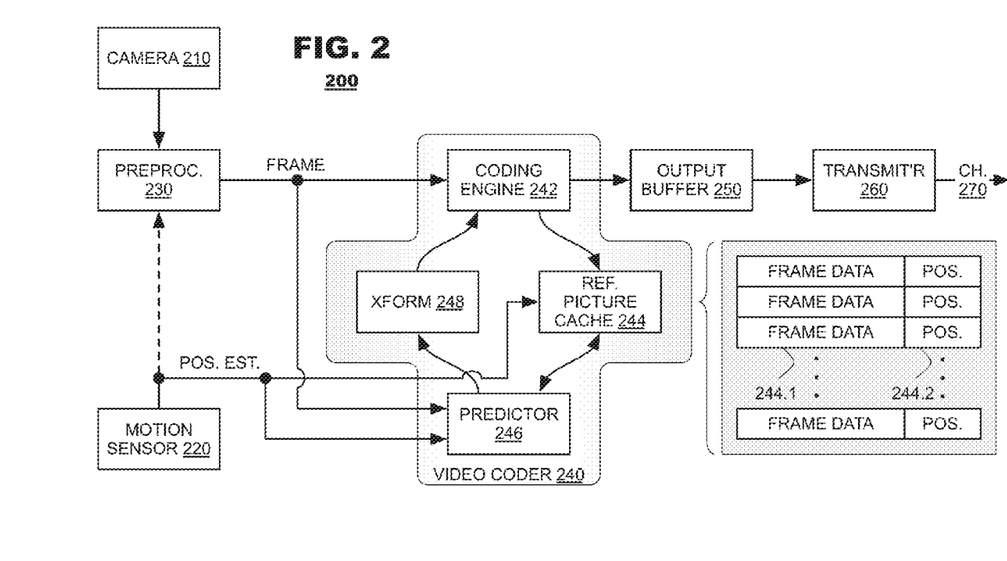
FIG. 2 is a simplified block diagram of a coding device according to an embodiment of the present invention.

FIG. 2 is a simplified block diagram of a coding device 200 according to an embodiment of the present invention. The coding device 200 may include a camera 210, a motion sensor 220, a preprocessor 230, a video coder 240, an output buffer 250 and a transmitter 260. The camera 210 may generate video data representing captured image information. The preprocessor 230 may apply video processing operations on the video data to improve its quality or condition the video data for coding. The video coder 240 may exploit temporal and/or spatial redundancy in the video data to reduce its bit rate. The output buffer 250 may store coded video data prior to transmission by the transmitter 260 to a channel. The video coder may operate according to the syntax established for the MPEG, H.263, H.264 and/or H.265 (HEVC) families of video coding standards.

The motion sensor 220 may generate data representing spatial orientation of the camera 210. The motion sensor 220 may include a sensor device, such as a gyroscope and/or an accelerometer, and a processing system to interpret the sensor data and estimate the camera's position in free space.

As indicated, the preprocessor 230 may perform video processing operations upon the camera video data to improve quality of the video data or to condition the video data for coding. For example, the preprocessor 230 may perform video stabilization and other processes to improve quality of the video data. The preprocessor 230 may perform other operations, such as spatial filtering, temporal filtering, and noise detection and removal to condition the video data for coding.

The video coder 240 may perform coding operations on the video sequence to reduce the video sequence's bit rate. The video coder 240 may include a coding engine 242, a reference picture cache 244, a predictor 246 and a transform unit 248. The coding engine 242 may code the input video data by exploiting temporal and spatial redundancies in the video data and may generate a datastream of coded video data, which typically has a reduced bit rate as compared to the datastream of source video data. As part of its operation, the video coder 240 may perform motion compensated predictive coding, which codes an input frame predictively with reference to one or more previously-coded frames from the video sequence that were designated as "reference frames." In this manner, the coding engine 242 codes differences between pixel blocks of an input frame and pixel blocks of reference frame(s) that are selected as prediction reference(s) to the input frame.

For example, frames often are assigned as one of the following frame types:
  An Intra Frame (I frame) is one that is coded and decoded without using any other frame in the sequence as a source of prediction,
  A Predictive Frame (P frame) is one that is coded and decoded using earlier frames in the sequence as a source of prediction.

A Bidirectionally Predictive Frame (B frame) is one that is coded and decoded using both earlier and future frames in the sequence as sources of prediction.

Frames commonly are parsed spatially into a plurality of pixel blocks (for example, blocks of 4×4, 8×8 or 16×16 pixels each) and coded by the video coder 240 on a pixel block-by-pixel block basis. Pixel blocks may be coded predictively with reference to other coded pixel blocks as determined by the coding assignment applied to the pixel blocks' respective frames. For example, pixel blocks of I frames may be coded non-predictively or they may be coded predictively with reference to pixel blocks of the same frame (spatial prediction). Pixel blocks of P frames may be coded predictively via temporal prediction with reference to a single previously-coded reference frame. Pixel blocks of B frames may be coded predictively via temporal prediction with reference to one or two previously-coded reference frames. The previously coded reference frames may be stored in the reference picture cache 244 as part of prior coding operations.

The coding engine 242 may include a local decoder (not shown) that may decode coded video data of the frames that are designated as reference frames. Operations of the coding engine 242 typically are lossy processes. When the coded video data is decoded at a video decoder device (not shown), the recovered video sequence typically is a replica of the source video sequence with some errors. The local decoder may perform, at the coding device 200, the decoding processes that will be performed by the video decoder on reference frames and may cause reconstructed reference frames to be stored in the reference picture cache 244. In this manner, the coding device 200 may store copies of reconstructed reference frames locally that have common content as the reconstructed reference frames that will be obtained by a far-end video decoder absent transmission errors.

The reference picture cache 244 may store data 244.1 of the decoded reference pictures and position data 244.2 for each frame representing the camera's position in free space when the source data of the decoded reference frame was captured. Thus, the reference picture cache 244 stores data that permits the video coder 240 to compare camera positions at the time of capture for input frames that are to be coded with corresponding camera positions of other input frames that became reference frames.

The predictor 246 may perform prediction searches for the coding engine 242. That is, for a new frame to be coded, the predictor 246 may search the reference picture cache 244 for image data that may serve as an appropriate prediction reference for the new frames. The predictor 246 may operate on a pixel block-by-pixel block basis to find appropriate prediction references. In some cases, as determined by search results obtained by the predictor 246, an input frame may have prediction references drawn from multiple frames stored in the reference picture cache 244. When the predictor 246 finds a match, prediction data from the matching reference frame may be output to the transform unit 248, which may apply a transform to the prediction data to match the position of the reference frame to the position of the input frame. The transform unit 248 may apply a transform to prediction data based on the camera's position $\theta_{IN}$ when the input frame was captured and the camera's position $\theta_{REF}$ when the reference frame was captured. Additionally, the predictor 246 may generate a motion vector identifying a portion of the matching reference frame that serves as a prediction reference for the portion of input data being coded; the coding engine 242 typically codes input frames on a pixel block-by-pixel block basis and motion vectors may be generated for each such pixel block. The coding engine 242 may code the input frame with reference to the transformed reference frame data.

During operation, the camera 210 may generate video data at a predetermined frame rate. The motion sensor 220 may generate output data indicating, for each frame, the camera's estimated orientation in free space when the respective frame was captured. The preprocessor 230 may perform processing operations upon the video data output by the camera 210. If the preprocessor 230 is configured to apply video stabilization processing to the video sequence, it may do so using frame-to-frame position information from the motion sensor 220 as a basis from which to estimate camera motion. The preprocessor 230 may output a processed video sequence to the video coder 240.

In an embodiment, the motion sensor 220 may generate a position estimate that is represented as a rotation from a reference position to the camera's current position. The video coder 240 may use the position estimate to identify a reference picture from the reference picture cache to serve as a prediction reference for an input frame. As illustrated in FIG. 2, a predictor 246 may search the reference picture cache 244 for a stored reference frame having a position that most closely matches the input frame's position. The predictor 246 may output the reference frame to the transform unit 248. The transform unit 248 may apply a transform to the matching reference frame data to align the reference frame's content with the input frame and may output transformed reference picture data to the coding engine 242 for use in pixel block coding.

Figure 4:
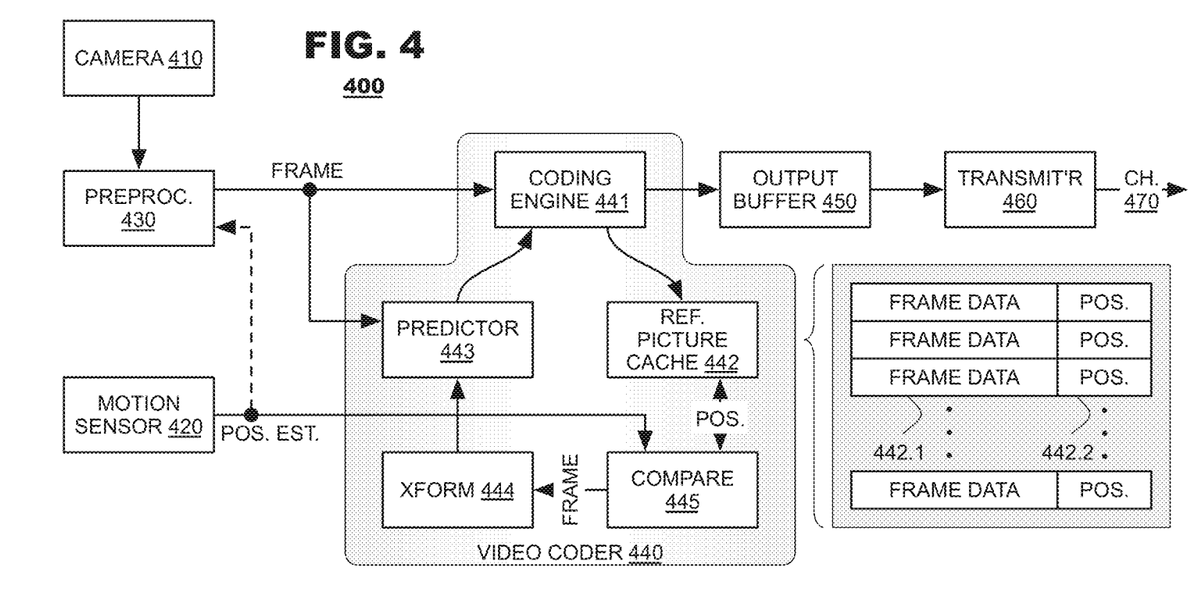
FIG. 4 is a simplified block diagram of a coding device according to an embodiment of the present invention.

The coding device 400 may represent the camera positions in a 3D rotation format, namely the quaternion format $q=(w, x, y, z)$ where the 3D vector $(x, y, z)$ indicates the rotation axis, and $w=\cos(a/2)$ where $a$ is the rotation angle with respect to the axis. To derive a transform matrix, the system may compute the rotation from the camera position of a reference frame $(q_{ref})$ to that of the current frame $(q_{in})$. The system may calculate a rotation difference $q_\Delta$ as $q_\Delta = q_{in} * \text{inv}(q_{ref})$. The rotation $q_\Delta$ may represent a rotation of the camera from a position of the reference frame to the initial position and then rotating it from the initial position to the position of the input frame.

The rotation matrix V may be set as a quaternion to spatial rotation matrix, namely.

$$V = \begin{bmatrix} w^2 + x^2 - y^2 - z^2 & 2xy - 2wz & 2(wy + xz) \\ 2(xy + wz) & w^2 - x^2 + y^2 - z^2 & 2(yz - wx) \\ 2(xz - wy) & 2(wx + yz) & w^2 - x^2 - y^2 + z^2 \end{bmatrix}$$

The transform also may be adjusted to accommodate camera zooming if the camera focus lengths of the current and reference frames differ from each other.

In an embodiment, to simplify calculations and conserve resources, the coding device 400 may convert the perspective transform matrix into an affine transform matrix. To do so, the system may extract a yaw rotation angle from the perspective matrix V, and generate a 2D rotation matrix based on the yaw rotation angle only. In this instance, the yaw rotation may be the rotation with to respect the camera view direction. In addition, pitch and roll rotation angles may be used to estimate global motion vector that further reduces power consumption in motion estimation The coding engine 242 may include a local decoder (not shown) to decode coded data of input frames that are designated to be reference frames and to store the decoded reference frame data in the reference picture cache 244. When a decoded reference frame is stored in the reference picture cache 244, camera position data may be stored in the cache as well for use in later prediction searches.

Embodiments of the present invention may work jointly with pre-processing systems that perform video stabilization. In this case, camera position estimates may be modified to account for transforms applied by the pre-processor since the preprocessor will have altered the video and, therefore, the original camera estimates would not be aligned with the processed video.

Figure 3:
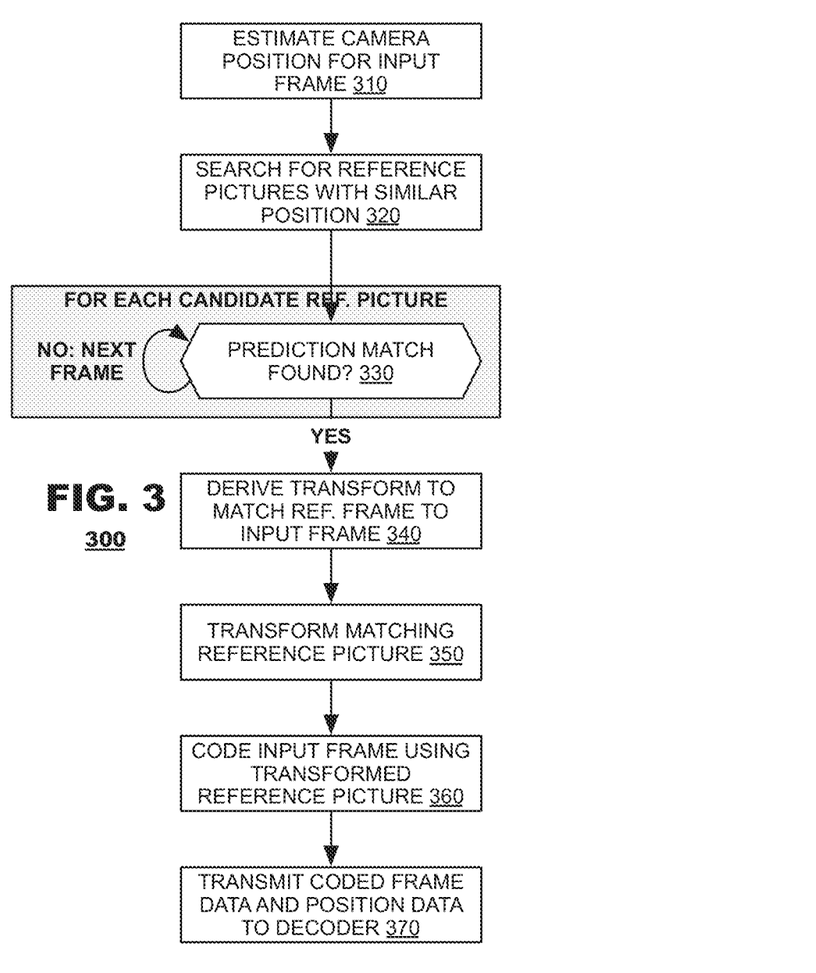
FIG. 3 illustrates a method according to an embodiment of the present invention.

FIG. 3 illustrates a method 300 according to an embodiment of the present invention. The method 300 may begin when a new input frame is available for coding. The method 300 may estimate a camera position for the input frame (box 310). The method 300 may search for reference pictures having similar camera positions as the position of the input frame (box 320). For each reference picture identified in box 320, the method 300 may perform a prediction search to determine if a reference picture is an adequate prediction match for the input frame (box 330). If not, the method 300 may cycle to the next reference picture identified in box 320. When the method 300 identifies a reference picture with a similar position that can serve as prediction source for the input frame, the method 300 may derive a transform, from camera positions $\theta_{IN}$, $\theta_{REF}$ of the input and reference frames, to match the reference frame data to the input frame data (box 340). The method 300 may transform the reference picture according to the transform (box 350) and code the input frame using the transformed reference picture as a prediction reference (box 360). Thereafter, the method 300 may transmit coded frame data and the camera position of the input frame to a decoder (box 370).

The method of FIG. 3 finds application in resource limited coding environments where it would be impractical to transform every stored reference picture for every input picture. In an encoder having N reference pictures, it would require derivation of N transforms and execution of the N transforms for every frame input to the video coder. At conventional video frame rates, for example, 24 or 30 frames per second, derivation and execution of the N transforms can be computationally prohibitive. By contrast, execution of the method 300 of FIG. 3 requires derivation and execution of a transform (boxes 340, 350) only after a prediction match is found (box 330) and, therefore, the method of FIG. 3 requires the derivation and execution operations to be performed only once.

FIG. 4 is a simplified block diagram of a coding device 400 according to an embodiment of the present invention. The device 400 may include a camera 410, a motion sensor 420, a preprocessor 430, a video coder 440, an output buffer 450 and a transmitter 460. The camera 410 may generate video data representing captured image information. The motion sensor 420 may generate data representing spatial orientation of the camera 410. The preprocessor 430 may perform video processing operations upon the camera video data to improve quality of the video data or to condition the video data for coding. The video coder 440 may code the video data by exploiting temporal and/or spatial redundancies therein to reduce its bit rate. The output buffer 450 may store coded video data and merge it with data from other sources (not shown) within the device 400 to form channel data. The transmitter 460 may format the channel data for delivery over a channel 470 and transmit the channel data. In this regard, the channel data may be formatted to be consistent with one of the governing coding protocols, for example, the MPEG, H.263, H.264 and/or H.265 (HEVC) families of video coding standards.

The motion sensor 420 may generate data representing spatial orientation of the camera 410. The motion sensor 420 may include a sensor device such as a gyroscope and/or an accelerometer, and a processing system to interpret the sensor data and estimate the camera's position in free space.

As indicated, the preprocessor 430 may perform video processing operations upon the camera video data to improve quality of the video data or to condition the video data for coding. For example, the preprocessor 430 may perform video stabilization and other processes to improve quality of the video data. The preprocessor 430 may perform other operations, such as spatial filtering, temporal filtering, noise detection and removal, to condition the video data for coding.

FIG. 4 also illustrates components of a video coder 440, which may include a coding engine 441, a reference picture cache 442, a predictor 443, a transform unit 444 and a comparator 445. The coding engine 441 may code the video data output from the preprocessor according to reference data supplied to it. The reference picture cache 442 may store data of reference frames that have been coded, and then decoded by the coding engine 441. As illustrated in FIG. 4, the reference picture cache 442 may store data 442.1 of the decoded reference pictures and position data 442.2 for each frame representing the camera's position in free space when the source data of the decoded reference frame was captured. The predictor 443 may search, during coding of a new input frame, among the reference picture cache 442 for stored data that may be used as a prediction reference for the input frame. The transform unit 444 may apply a transform to prediction data based on the camera's position $\theta_{IN}$ when the input frame was captured and the camera's position $\theta_{REF}$ when the reference frame was captured. The comparator 445 may compare position data of the input frame to position data of the reference frames stored in the reference picture cache 442.

During operation, the camera 410 may generate video data at a predetermined frame rate. The motion sensor 420 may generate output data indicating, for each frame, the camera's estimated orientation in free space when the respective frame was captured. The preprocessor 430 may perform processing operations upon the video data output by the camera 410. Again, the preprocessor 430 may perform video stabilization using frame-to-frame position information from the motion sensor 420. The preprocessor 430 may output a processed video sequence to the video coder 440.

The video coder 440 may perform compression operations on its input data according to motion-compensated prediction techniques. Frames may be selected according to intra- or inter-prediction modes. Intra-predicted frames are to be coded without reference to any other frame in the video sequence; the coding engine 441 may code portions of the input frame with reference to other portions of the same frame. Inter-predicted frames may be coded with reference to decoded data of other previously-coded reference frames stored in the reference picture cache 442. To inter-code an input frame, the video coder 440 may compare position data of the input frame to position data of the reference frames stored in the reference picture cache 442, represented as comparator 445. The comparator 445 may identify a sub-set of the reference pictures that have similar camera orientation as the input frame. The transform unit 444 may derive and apply a transform to the sub-set of reference frames to change a perspective of the reference picture to match that of the input frame. Thereafter, predictor 443 may search among content of the transformed reference picture to find content that provides an appropriate match to content of the input frame and, when such data is found, it may output the matching content of the transformed reference picture to the coding engine 441. The coding engine 441 may code the input frame with reference to the transformed reference frame data.

Figure 5:
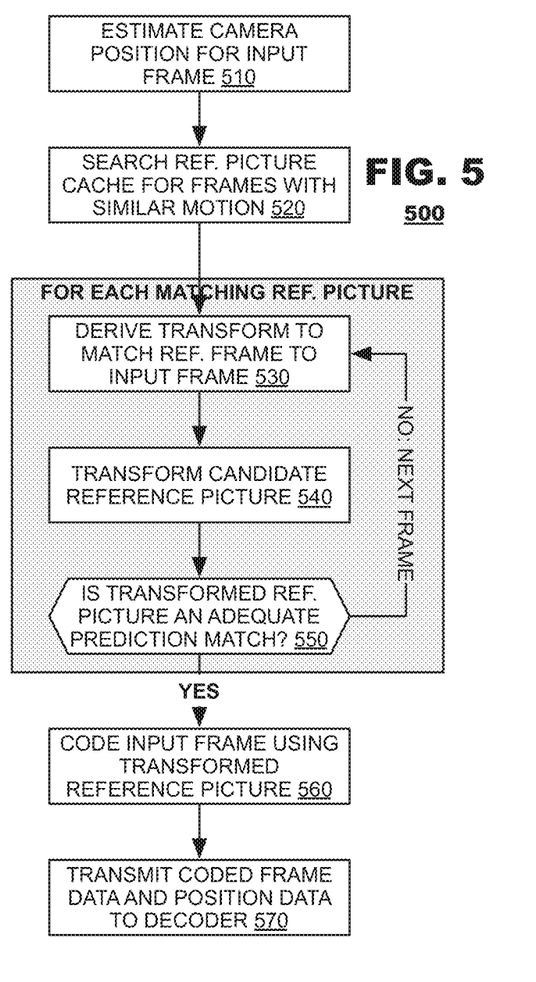
FIG. 5 illustrates a method according to another embodiment of the present invention.

FIG. 5 illustrates a method according to another embodiment of the present invention. The method 500 may begin when a new input frame is available for coding. The method 500 may estimate a camera position for the input frame (box 510). The method 500 may search for reference pictures having similar camera positions as the position of the input frame (box 520). For each reference picture identified in box 520, the method 500 may derive a transform, from camera positions $\theta_{IN}$, $\theta_{REF}$ of the input and reference frames, to match the reference frame data to the input frame data (box 530). The method 500 may transform the reference picture according to the transform (box 540). Thereafter, the method 500 may perform a prediction search to determine if the transformed reference picture is an adequate prediction match for the input frame (box 550). If not, the method 500 may cycle to the next reference picture identified in box 520. When the method 500 identifies a transformed reference picture with similar position that can serve as a prediction source for the input frame, and code the input frame using the transformed reference picture as a prediction reference (box 560). Thereafter, the method 500 may transmit coded frame data and the camera position of the input frame to a decoder (box 570).

The method of FIG. 5 finds application in resource limited coding environments where it would be impractical to transform every stored reference picture for every input picture. Execution of the method 500 of FIG. 5 requires derivation and execution of transforms (boxes 530, 540) only until a prediction match is found (box 550). In an embodiment, processing of the frames may be ordered to consider first those reference frames whose camera position is most similar to the camera position of the input frame and to defer consideration of other reference frames whose camera positions have greater differences with respect to the camera position of the input frame. Alternatively, processing of the frames may be ordered according to the closeness of the camera positions and capturing times to those of the input frame. Therefore, the method of FIG. 5 increases the likelihood that the derivation and execution operations of boxes 530, 540 will be performed a minimum number of times to identify an appropriate prediction reference.

In yet another embodiment (not shown), a video coder 440 (FIG. 4) may compare other statistics of the input frame to corresponding statistics of the reference frames to select frames for transform. For example, the video coder 440 may compare brightness estimates, spatial complexity estimates and/or motion blur estimates of the input frame to corresponding statistics from the reference frames. Such statistics may be developed by the preprocessor 430 and may be stored in associated entries of the reference picture cache 442.

Figure 6:
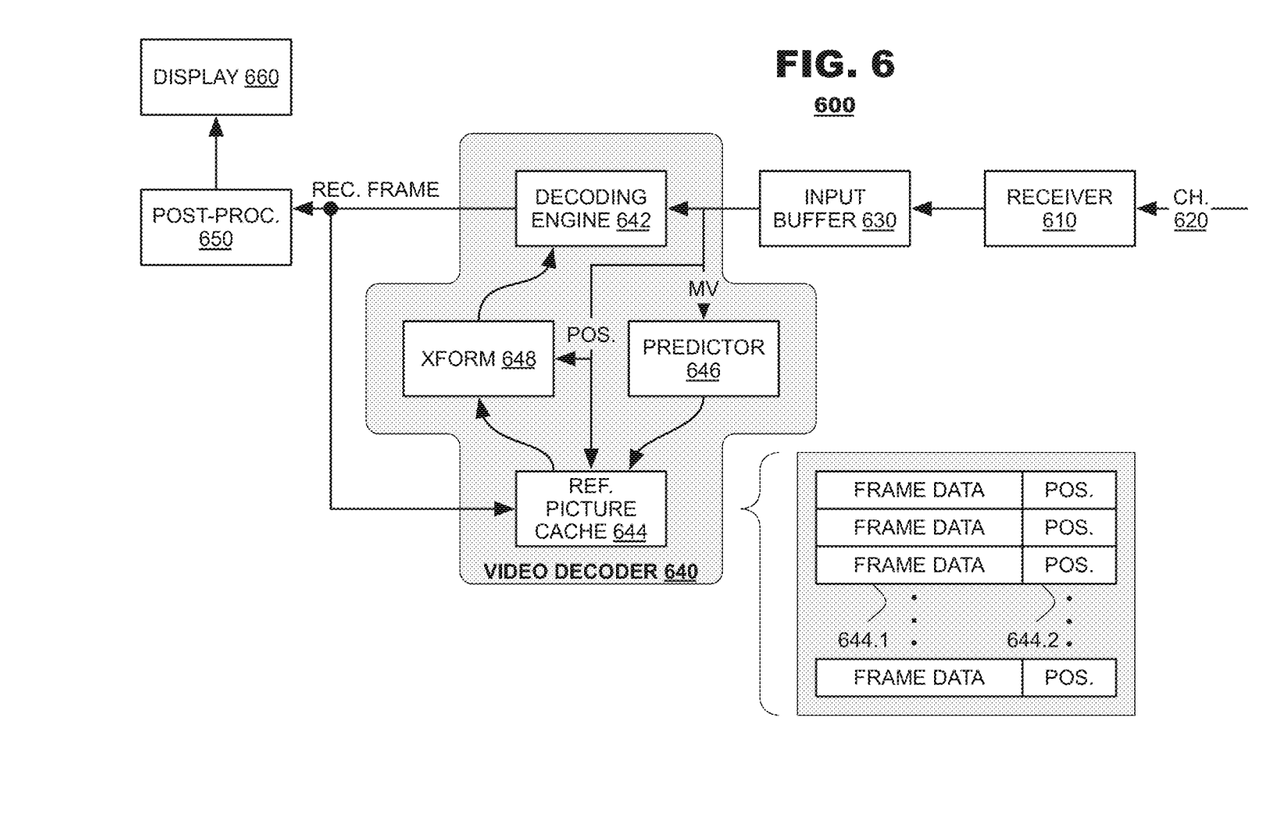
FIG. 6 is a simplified block diagram of a decoding device according to an embodiment of the present invention.

FIG. 6 is a simplified block diagram of a decoding device 600 according to an embodiment of the present invention. The device 600 may include a receiver 610, an input buffer 630, a video decoder 640, an optional post-processor 650 and a display 660. The receiver 610 may receive channel data from a channel 620. The input buffer 630 may store the channel data and parse the channel data into component data streams. For example, the input buffer 630 may extract coded video data from the channel data and provide it to the video decoder 640.

The video decoder 640 may recover frame data from coded video data in the input buffer 630. The video decoder 640 may invert coding operations that were performed by a video coder (FIGS. 2, 4). For example, the video decoder may operate according to the protocols established for the MPEG, H.263, H.264 and/or H.265 (HEVC) families of video coding standards. The video decoder 640 may output recovered frame data that replicates source frame data that was coded by the video coder. The post-processor 650 may perform video processing operations upon the recovered video data to improve quality of the video data for rendering. The display 660 may render the recovered video data output by the video decoder 640 or post-processor 650.

FIG. 6 also illustrates components of a video decoder 640, which may include a decoding engine 642, a reference picture cache 644, a predictor 646 and a transform unit 648. The decoding engine 642 may invert coding operations performed by a coding engine of a video coder (FIGS. 2, 4) and outputs the recovered frame data. The reference picture cache 644 may store data decoded reference frames that are output by the decoding engine 642. As illustrated in FIG. 6, the reference picture cache 644 may store data 644.1 of the decoded reference pictures and position data 644.2 for each frame received via the coded video data. The predictor 646 may cause prediction data to be retrieved from the reference picture cache 644 responsive to motion vectors (mv) contained in the coded video data. The transform unit 648 may apply a transform to prediction data based on the position $\theta_{IN}$ in the coded video data and position data $\theta_{REF}$ associated with the reference frame output from the reference picture cache 644 under control of the predictor 646.

During operation, the receiver 610 may receive channel data and store it in the input buffer 630. The input buffer may output coded video data to the video decoder 640 for further processing. The predictor 646 may respond to motion vectors contained in the coded video data and output prediction data from the reference picture cache 644. The transform unit 648 may respond to position data contained in the coded video data and position data associated with the prediction data to derive a transform and to apply the transform being output from the reference picture cache 644. The transform unit 648 may output the transformed prediction data to the decoding engine 642 which may use the prediction data as a basis to decode a current frame.

In an embodiment, the transform unit 648 may derive a perspective or an affine transform as described above with respect to FIG. 2.

The decoding engine 642 may cause recovered reference frames and the reference frames' position data to be stored in the reference picture cache 644. When a decoded reference frame is stored in the reference picture cache 644, camera position data may be stored in the cache as well for use in later prediction searches.

The post-processor 650 may filter recovered frame data which may be output to a display 660 for rendering. Alternatively, recovered frame data may be output to a storage device (not shown) for later use.

Several embodiments of the invention are specifically illustrated and/or described herein. However, it will be appreciated that modifications and variations of the invention are covered by the above teachings and within the purview of the appended claims without departing from the spirit and intended scope of the invention.

A storage device storing program instructions that, when executed by a processing device, may cause the processing device to estimate camera position for an input frame to be coded, and search for a reference picture having a similar position to the input frame. When a matching reference picture is found, the instructions may further cause the device to derive a transform to align the matching reference picture to the input frame, apply the transform to the matching reference picture, and code at least a portion of the input frame predictively with reference to the transformed reference picture.

A storage device storing program instructions that, when executed by a processing device, may cause the processing device to respond to a motion vector provided in a channel associated with a coded input frame to be decoded by searching among previously-decoded reference pictures for a reference picture identified by the motion vector, transforming the reference picture based on position data provided in a channel associated with the coded input frame, and decoding the coded input frame by motion-compensated prediction decoding using the transformed picture data as a basis of prediction.

We claim:

1. A coding system comprising a processing device and a storage device, the storage device storing program instructions that, when executed by the processing device, cause the system to:
   estimate camera position for an input frame to be coded,
   search for a reference picture having a similar position to the input frame based on position information in a reference picture cache corresponding to each reference picture in the reference picture cache, wherein the reference picture cache contains a plurality of reference pictures reconstructed from coded reference pictures;
   when a matching reference picture is found, derive a transform based on a difference between position data in the reference picture cache of the matching reference picture and the camera position for the input frame to align the matching reference picture to the input frame,
   apply the transform to the matching reference picture; and
   code at least a portion of the input frame predictively with reference to the transformed reference picture.

2. The coding system of claim 1, wherein the transform is a 3 D transform.

3. The coding system of claim 1, wherein the transform is a 2 D transform.

4. The coding system of claim 1, wherein the transform is a perspective transform.

5. The coding system of claim 1, wherein the transform is an affine transform.

6. The coding system of claim 1, wherein the position data is quaternion data.

7. The coding system of claim 1, wherein the system includes a camera and a motion sensor, wherein the camera provides the input frame and the motion sensor provides data from which the position data is derived.

8. A decoding system comprising a processing device and a storage device, the storage device storing program instructions that, when executed by the processing device, cause the system to:
   responsive to prediction data for a coded input frame indicating a motion vector and a decoded reference picture, transform the decoded reference picture based on a difference between position data in a reference picture cache associated with the decoded reference picture and position data provided in a channel associated with the coded input frame, wherein position data identifies a plurality of positions of an image capture device during capture of a plurality of associated frames before coding, and
   decode the coded input frame by motion-compensated prediction decoding using the transformed picture data as a basis of prediction.

9. The decoding system of claim 8, wherein the transform is a 3 D transform.

10. The decoding system of claim 8, wherein the transform is a 2 D transform.

11. The decoding system of claim 8, wherein the transform is a perspective transform.

12. The decoding system of claim 8, wherein the transform is an affine transform.

13. The decoding system of claim 8, wherein the position data is quaternion data.

14. A coding method, comprising:
    estimating camera position for an input frame to be coded,
    searching position data in a picture reference cache for a reference picture having a similar position to the input frame, wherein the reference picture cache contains reference pictures that are reconstructed from coded reference pictures,
    when a matching reference picture is found, deriving a transform based on a difference between position data of the reference picture in the reference picture cache and the camera position for the input frame to align the matching reference picture to the input frame,
    applying the transform to the matching reference picture, and
    coding at least a portion of the input frame predictively with reference to the transformed reference picture.

15. The method of claim 14, wherein the transform is a 3 D transform.

16. The method of claim 14, wherein the transform is a 2 D transform.

17. The method of claim 14, wherein the transform is a perspective transform.

18. The method of claim 14, wherein the transform is an affine transform.

19. The method of claim 14, wherein the estimating comprises deriving the camera picture from quaternion data.

20. A coding method, comprising:
    estimating camera position for an input frame to be coded,
    searching for a set of reference pictures having similar positions to the input frame by searching positions stored in a reference picture cache, wherein the reference picture cache contains reference pictures that are reconstructed from coded reference pictures,
    deriving transforms based on a difference between position data in the reference picture cache of the set of reference pictures and the camera position for the input frame to align the matching reference pictures to the input frame,
    applying the transforms respectively to the matching reference pictures,
    for pixel blocks in the input picture, searching among the transformed reference pictures for prediction reference,
    coding the pixel blocks predictively with reference to transformed reference pictures data identified respectively in the searches.

21. The method of claim 20, wherein the transform is a 3 D transform.

22. The method of claim 20, wherein the transform is a 2 D transform.

23. The method of claim 20, wherein the transform is a perspective transform.

24. The method of claim 20, wherein the transform is an affine transform.

25. The method of claim 20, wherein the estimating comprises deriving the camera picture from quaternion data.

26. A storage device storing program instructions for coding that, when executed by a processing device, cause the processing device to:
   estimate camera position for an input frame to be coded,
   search for a reference picture having a similar position to the input frame based on position information in a reference picture cache corresponding to each reference picture in the reference picture cache, wherein the reference picture cache contains reference pictures that are reconstructed from coded reference pictures,
   when a matching reference picture is found, derive a transform based on a difference between position data in the reference picture cache of the matching reference picture and the camera position for the input frame to align the matching reference picture to the input frame, apply the transform to the matching reference picture, and code at least a portion of the input frame predictively with reference to the transformed reference picture.

27. A storage device storing program instructions for decoding that, when executed by a processing device, cause the processing device to:
   responsive to prediction data for a coded input frame indicating a motion vector and a decoded reference picture, transform the decoded reference picture based on a difference between position data in a reference picture cache associated with the decoded reference picture and position data provided in a channel associated with the coded input frame, wherein position data identifies a position of an image capture device during capture of the associated frame before coding, and
   decode the coded input frame by motion-compensated prediction decoding using the transformed picture data as a basis of prediction.

* * * * *